United States Patent
Moritaku et al.

(10) Patent No.: US 6,965,463 B1
(45) Date of Patent: Nov. 15, 2005

(54) IMAGE READING APPARATUS (75) Inventors: Toshimitsu Moritaku, Nangano (JP); Isao Izumihara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/559,313

(22) Filed: Apr. 27, 2000

(30) Foreign Application Priority Data

| Apr. 28, 1999 | (JP) | ............................................. 11-121607 |
| Mar. 29, 2000 | (JP) | ...................................... 2000-090792 |

(51) Int. Cl.[7] .......................... H04N 1/46; H04N 1/04; H04N 9/097; G06K 9/20
(52) U.S. Cl. ...................... 358/513; 358/514; 358/516; 358/483; 382/317; 348/262
(58) Field of Search ............................... 358/513, 514, 358/516, 483; 382/317; 348/262

(56) References Cited

U.S. PATENT DOCUMENTS

| 4,712,137 | A |   | 12/1987 | Kadekodi et al. |         |
| 4,775,799 | A |   | 10/1988 | Milch et al.    |         |
| 5,428,463 | A |   | 6/1995  | Goto            |         |
| 5,550,647 | A | * | 8/1996  | Koike ........................ | 358/3.03 |
| 5,721,628 | A | * | 2/1998  | Takaragi et al. ............ | 358/518 |
| 5,841,554 | A |   | 11/1998 | Hasegawa        |         |
| 5,917,620 | A | * | 6/1999  | Hasegawa et al. .......... | 358/513 |
| 6,496,286 | B1 | * | 12/2002 | Yamazaki ................... | 358/514 |
| 2002/0093697 | A1 | * | 7/2002 | Spears et al. ............... | 358/514 |

FOREIGN PATENT DOCUMENTS

| EP | 0 271 912 A2 | 6/1988 |
| EP | 0 663 763 A2 | 7/1995 |
| JP | A 61-114647  | 6/1986 |
| JP | 4-337967     | 5/1991 |
| JP | A 5-75780    | 3/1993 |
| JP | A 7-283915   | 10/1995 |

* cited by examiner

Primary Examiner—Edward Coles
Assistant Examiner—Houshang Safaipour
(74) Attorney, Agent, or Firm—Oliff & Berridge, PLC (57) ABSTRACT

An image processing unit (20) includes a averaging circuit (21) and a memory (22) for storing pixel data. The memory (22) is a memory for storing the pixel data subjected to analog-to-digital conversion. The averaging circuit (21) performs an averaging process between two adjoining pixels on each line stored in the memory (22). The digital pixel data is stored in the memory (22) and the averaging process is performed between the two pixels in the main scanning direction using the pixel data read by a first photoelectric conversion element trains and the pixel data read by a second photoelectric conversion element trains. Therefore, the noise component can be reduced, whereas the S/N ratio can be improved. Accordingly, image quality is made improvable with a simple arrangement.

12 Claims, 7 Drawing Sheets

IMAGE READING APPARATUS

BACKGROUND OF THE INVENTION

1. Field of the Invention

The present invention relates to an image reading apparatus having a color image pick-up device.

The present application is based on Japanese Patent Application Nos. Hei. 11-121607 and 2000-90792, which are incorporated herein by reference.

2. Description of the Related Art

Some of the heretofore known image reading apparatus for reading an image on an original by moving a carriage in parallel to the surface of the original, the carriage being loaded with a color image pick-up device having line sensors such as three of CCDs including a number of pick-up elements arranged linearly for respectively reading three primary colors.

In the case of an flat-bed type image reading apparatus, for example, an original glass plate formed with a transparent plate such as glass for placing an original thereon is provided on the surface of a box-like casing. A carriage moved by a driving unit in parallel to the original glass plate is provided in the casing. The carriage is loaded with a light source and a color image pick-up device. The light emitted from the light source is reflected from the surface of the original on the original glass plate and concentrated by a condenser lens on the color image pick-up device.

In the image reading apparatus, increasing the number of pick-up elements constituting the CCD is needed to improve read resolution in the main scanning direction as the arrangement direction of the pick-up elements in the CCD. However, the CCD tends to increase in size when the number of pick-up elements is increased while the size of the individual elements remains equal and there is a problem arising from an increase in costs as the load of designing an optical system increases. On the other hand, decreasing the size of each element also develops a problem arising from limitations on production.

As disclosed in Unexamined Japanese Patent Publication No. Sho. 58-19081, there is known a CCD image sensor having a first optical detector train and a second optical detector train that is shifted from the first optical detector by about half the width of the individual optical detectors. In this CCD image sensor, the first optical detector train is set adjacent to the second optical detector train in the sub-scanning direction.

With the CCD image sensor having the plurality of optical detector trains, read resolution in the main scanning direction can be doubled in comparison with a CCD image sensor having a single optical detector train because the same line on the original is to be read by the first and second optical detector trains.

The output of the pick-up element in the CCD varies with the quantity of incident light and the charge accumulation time required. As the product of the quantity of light and the charge accumulation time increases, the output proportionally increases up to a predetermined level. However, the pick-up element has such characteristics that the output is saturated when the output reaches the predetermined level and never increased by increasing the quantity of incident light and prolonging the charge accumulation time. Since the output of the pick-up element contains an offset level due to a dark current, the dynamic range of the pick-up element is from the offset level up to the predetermined level.

In such an apparatus as this, it has been practiced to lower the offset level as a noise level when the original is read in high quality by reducing the dark current by cooling the CCD image sensor using a Peltier-device or the like. Thus, a high-quality image can be read because the dynamic range obtained from the output of the CCD image sensor is expandable and the S/N ratio is improvable.

Notwithstanding, an expensive part such as the Peltier-device needs using when the high-quality image is read through the method stated above and this also develops the problem of making the apparatus complicated, thus increasing the cost.

SUMMARY OF THE INVENTION

To solve the foregoing problems, an object of the present invention is to provide an image reading apparatus simple in construction for reading a high-quality image without increasing the cost.

Another object of the present invention is to provide an image reading apparatus capable of selecting a mode of reading an image different in resolution or image quality.

According to the first aspect of the present invention, there is provided an image reading apparatus which comprises a color image pick-up device has groups of pick-up elements corresponding to a plurality of colors, the groups of pick-up elements including a plurality of pick-up element trains which are arranged in parallel to one another on a substrate, the pick-up element train being formed with a plurality of pick-up elements arranged linearly. A pixel data storage device stores the pixel data subjected by the A/D conversion portion to the A/D conversion, and an averaging device applies an averaging process to a plurality of adjoining pixel data on each line stored in the pixel data storage device. Therefore, since the plurality of adjoining pixels in the main scanning direction are averaged, a noise component becomes reducible, whereas image quality becomes improvable.

Further, as an averaging area device averaging the pixel data read by the plurality of pick-up element trains, obtainable resolution becomes equal to read resolution in the color image pick-up device having one pick-up element train. Consequently, the noise component is reducible without lower the resolution.

Further, original reading time can be shortened because the same pixel is not read a plurality of times. Thereby high-speed reading with the noise component reduced is made possible.

According to the second aspect of the present invention, the image reading apparatus may further comprise a selection device which selects whether applying the averaging process to the plurality of adjoining pixel data on each line stored in the pixel data storage device. Accordingly, it is possible to select reading an image with the basic resolution as the highest resolution of the image reading apparatus or reading a high-quality image at an improved S/N ratio.

Figure 7:
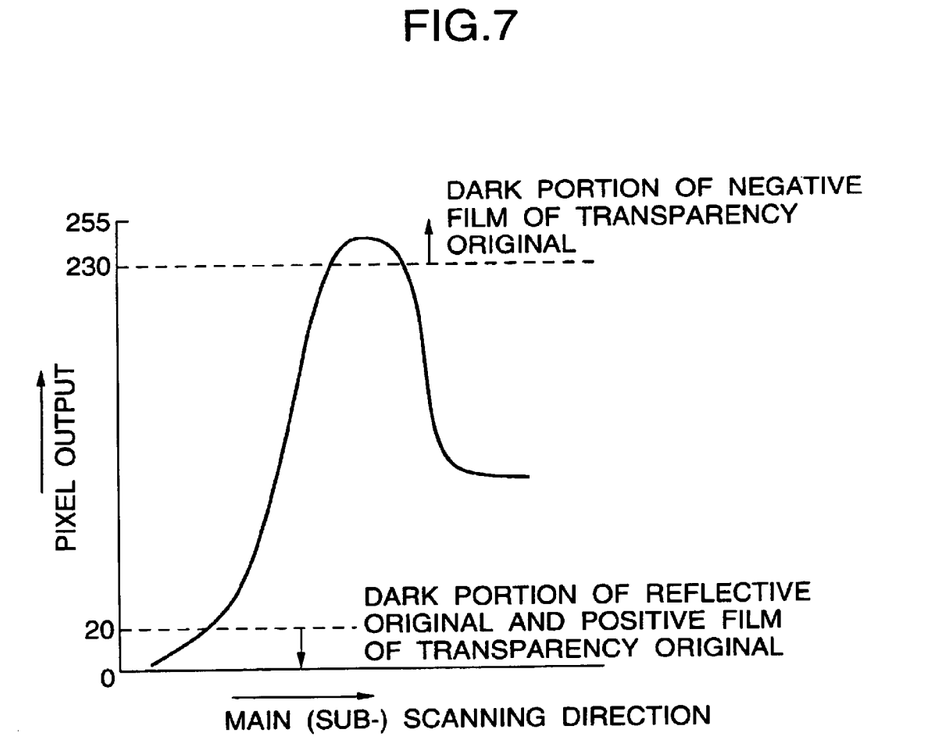
FIG. 7 is a data graph showing an example of pixel output in the case of 256 gradations for explaining pixel data in an dark and a light portion.

There is considered a case where image data in a dark portion is read as what is advantageous to read the high-quality image at the improved S/N ratio. The pixel data in the dark portion refers to pixel data at a level lower than an output level of about 20 in the positive film of the reflective or transparency original or pixel data at a level high than an output level of about 230 in the negative film of the transparency original in the case of 256 gradations as shown in FIG. 7. Accordingly, the pixel data of the dark portion has a level value equivalent to a dark level rather than the predetermined level value. The pixel data in the light portion refers to pixel data at a level higher than the output level of about 20 in the positive film of the reflective or transparency original or pixel data at a level lower than the output level of about 230. Accordingly, the pixel data of the light portion has a level value equivalent to a light level rather than the predetermined level value. Normally, the S/N ratio of the image thus read becomes problematical with respect to the pixel data of the dark portion rather than that of the light portion.

According to the third aspect of the present invention, the image reading apparatus may further comprise an input device capable of setting a mode of reading an image different in at least one of resolution and image quality, wherein the averaging process is not performed when a mode giving priority to resolution is set by the input device but performed when the mode giving priority to image quality is set thereby in order to read the image. Accordingly, it is possible to select the mode giving priority to resolution or image quality.

According to the fourth aspect of the present invention, in the color image pick-up device, it is preferable that at least one of the pick-up element trains is shifted relative to at least another of the pick-up element trains by a pitch smaller than width of one of the pick-up elements in an arrangement direction of the pick-up elements thereof. Accordingly, the original can be read with high resolution in the arrangement direction of the pick-up elements, that is, in the main scanning direction.

According to the fifth aspect of the present invention, in the color image pick-up device, it is preferable that the pick-up element trains are mutually arranged with a pitch integer times greater than twice each height of the pick-up elements in a direction perpendicular to an arrangement direction of the pick-up elements thereof. Accordingly, the same line on the original is read by the whole pick-up element train even though the color image pick-up device is relatively moved in the sub-scanning direction perpendicular to the main scanning direction at a speed integer times greater, whereby the same line can be read with low resolution at high speed.

According to the sixth aspect of the present invention, it is preferable that the groups of pick-up elements correspond to red, green and blue, respectively. Accordingly, the original can be read by decomposing the light from the original into the three primary colors.

According to the seventh aspect of the present invention, it is preferable that each of the groups of pick-up elements includes a first element train and a second element train, and wherein the second element train is shifted from the first element train by about half pitch of width of one of the pick-up elements. Accordingly, the read resolution in the main scanning direction can be doubled.

According to the eighth aspect of the present invention, it is preferable that each of the groups of pick-up elements includes an opening smaller than a light receiving area of one of the pick-up elements, and a shielding portion blocking off the light directed to a peripheral edge portion of one of the pick-up elements. Accordingly, resolution can substantially be improved since the portions read repeatedly by the plurality of elements on the original are decreased.

DETAILED DESCRIPTION OF THE PREFERRED EMBODIMENTS

Preferred embodiments of the present invention will now be described with reference to FIGS. 1 to 7.

1. First Embodiment

Referring to FIGS. 1 to 4, there is indicated a carriage-moving flat-bed type image reading apparatus as a first embodiment of the present invention.

Figure 2:
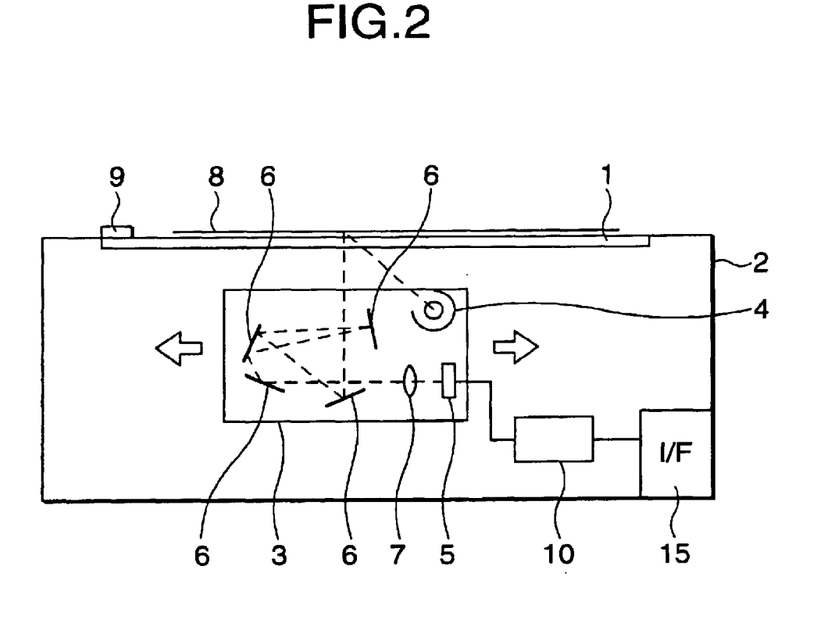
FIG. 2 is an exemplary diagram illustrating the image reading apparatus according to the first embodiment of the present invention.

As shown in FIG. 2, an original glass plate 1 including a transparent glass plate is provided on the surface of a casing 2. A carriage 3 that is reciprocated by a driving unit (not shown) in parallel to the original glass plate 1 is provided in the casing 2. A light source 4 and a color image pick-up device 5 are mounted in the carriage 3. The light emitted from the light source 4 is reflected from the surface of an original 8 on the original glass plate 1 and also reflected from a plurality of mirrors 6 before being concentrated at the color image pick-up device 5 by a condenser lens 7. The color image pick-up device 5 converts Red light (R), Green light (G) and Blue light (B) into corresponding electric signals and outputs the signals. Optical path length is thus increased by causing the light to be reflected from the plurality of mirrors 6. A white reference 9 having a high reflectance and a uniform reflective surface is provided in the end portion of the original glass plate 1 in the moving direction of the carriage 3.

Figure 3:
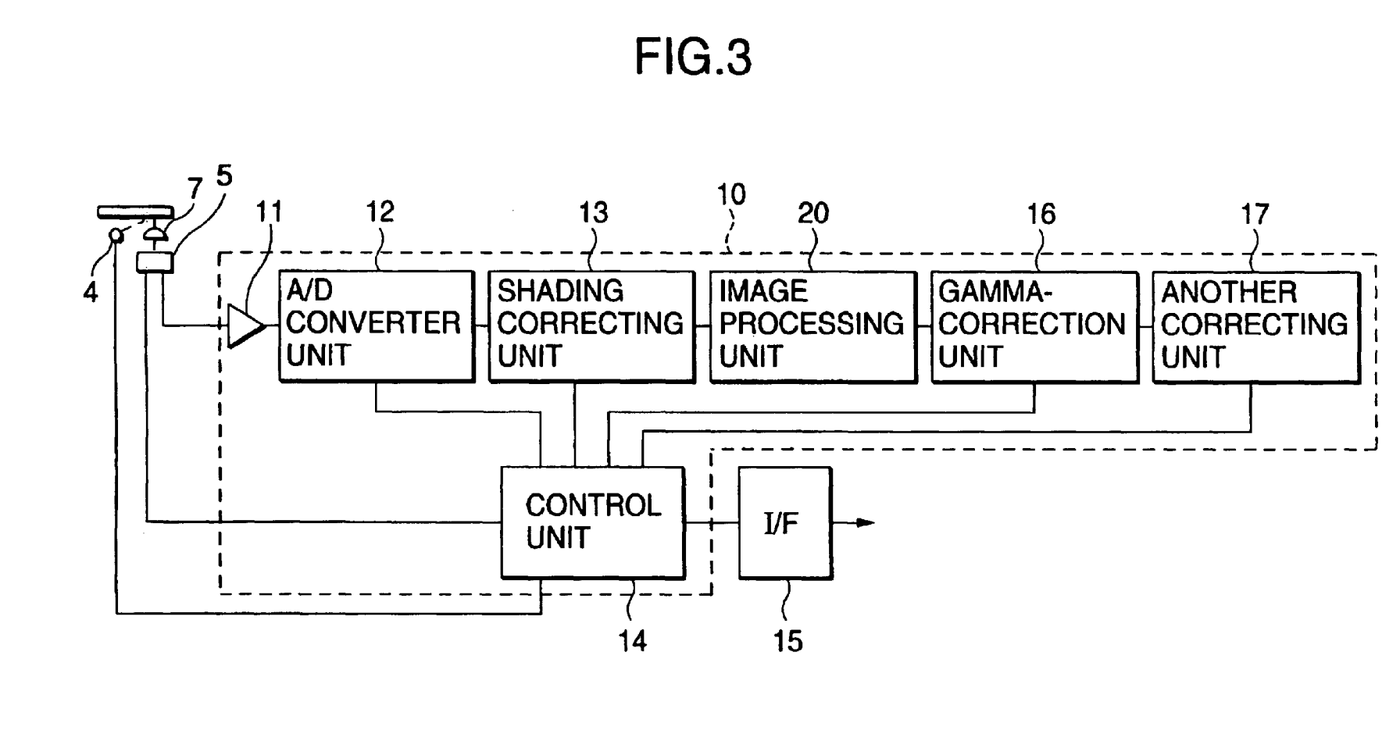
FIG. 3 is a block diagram illustrating the function and construction of the image reading apparatus according to the first embodiment of the present invention.

FIG. 3 is a block diagram illustrating the function and construction of the image reading apparatus thus configured above.

In FIG. 3, a control unit 14 includes a microcomputer including CPU, RAM, ROM and so on and is connected to an external image processing apparatus such as a personal computer via an interface 15. Further, the control unit 14 assumes control of charge storage time in the color image pick-up device 5 and selects gamma functions for use in gamma correction, as will be described below, according to command signals from the image processing apparatus.

An A/D converter unit 12 operates to convert data received from the color image pick-up device 5 via an amplifier 11 into digital signals and sends the signals to a shading correcting unit 13. In a case where a read graduation is a 10-bit one, the digital signal is what indicates numeral values from 0 up to 1,023. The shading correcting circuit 13 uses data resulting from reading the white reference 9 before the reading operation in order to correct variation in the sensitivity of each element in photoelectric conversion element trains and variation in the light quantity of the light source 4. Then the pixel data subjected to the shading correction is sent to an image processing unit 20. The image data subjected to an averaging process in the image processing unit 20 is sent to a gamma-correction unit 16, wherein gamma correction using a predetermined gamma function is carried out, so that the light quantity signal outputted from the image processing unit 20 is converted to an image signal. In another correction unit 17, color correction, edge emphasis, and conversions such as area expansion/contraction are carried out.

Figure 4:
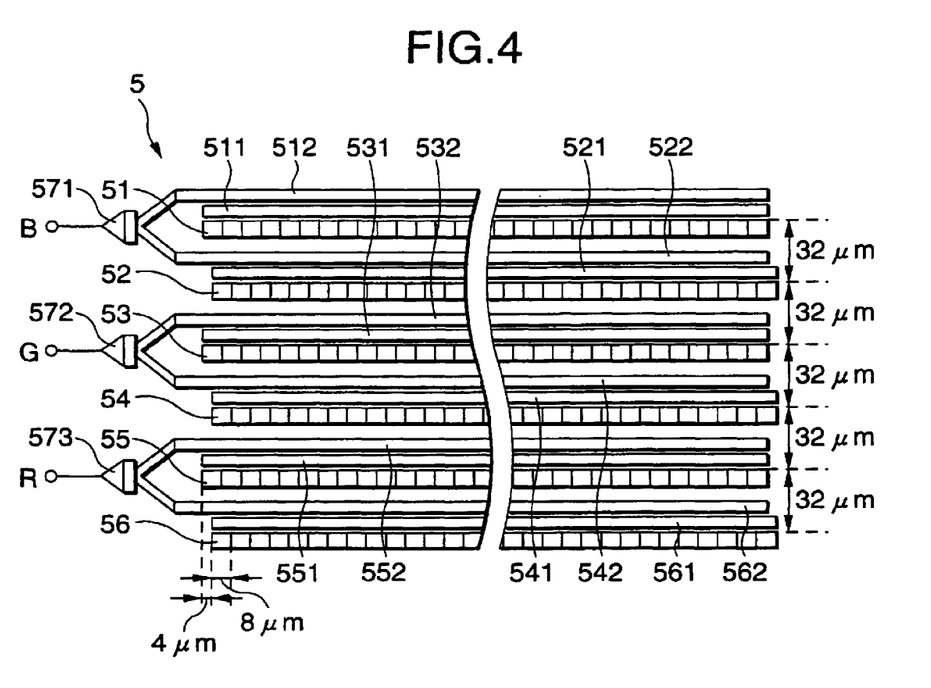
FIG. 4 is an exemplary diagram illustrating the color image pick-up device of the image reading apparatus according to the first embodiment of the present invention.

As shown in FIG. 4, the color image pick-up device 5 includes groups of pick-up elements for reading R, G and B light, respectively. The groups of pick-up elements respectively include pick-up element trains such as two lines of photoelectric conversion element trains including the first photoelectric conversion element trains 51, 53 and 55 as the first element trains and the second photoelectric conversion element trains 52, 54 and 56 as the second element trans formed with the linear pick-up elements such as the photoelectric conversion elements vertically in the direction of moving the carriage 3 shown in FIG. 2. As each pick-up element is a 8 μm×8 μm square according to the first embodiment of the present invention, one line of each photoelectric conversion element train is 8 μm wide. The first photoelectric conversion element trains 51, 53 and 55 are arranged by shifting the second photoelectric conversion element trains 52, 54 and 56 in the respective groups of pick-up elements by 4 μm that is half the width of the pick-up element in the main scanning direction.

The first photoelectric conversion element trains 51, 53 and 55 and the second photoelectric conversion element trains 52, 54 and 56 in the respective groups of pick-up elements are arranged with a pitch of 32 μm that is four times as great as the height of each pick-up element, that is, with a pitch equivalent to a width of four lines of the photoelectric conversion element trains. Moreover, the second photoelectric conversion element train 56 in the group of pick-up elements for reading R and the first photoelectric conversion element train 53 in the group of pick-up elements for reading G are arranged with a pitch equivalent to a width of four lines of the photoelectric conversion element trains. Further, the second photoelectric conversion element train 54 in the group of pick-up elements for reading G and the first photoelectric conversion element train 55 in the group of pick-up elements for reading R are arranged with a pitch equivalent to a width of four lines of the photoelectric conversion element trains. Therefore, six lines of the photoelectric conversion element trains 51 to 56 are arranged at equal intervals equivalent to a width of four lines of the photoelectric conversion element trains with respect to adjoining photoelectric conversion element trains.

The charge stored in each photoelectric conversion element train is transferred to shift registers 512, 522, 532, 542, 552 and 562 via transfer gates 511, 521, 531, 541, 551 and 561 in synchronization with a driving signal to be generated at predetermined intervals. The storage of the charge because of light from the next read line is started in each photoelectric conversion element train and the charge transferred to each shift register is outputted sequentially from output portions 571, 572 and 573 on one pixel basis.

In the first embodiment of the present invention, each photoelectric conversion element train is fabricated so as to read the original 8 with a resolution of 600 dpi (dot per inch) in the main scanning direction. Consequently, the color image pick-up device 5 can read one line with a resolution of 1,200 dpi by combining the pixel data read by the first photoelectric conversion element trains 51, 53 and 55 with respect to R, G and B with the pixel data read by the second photoelectric conversion element trains 52, 54 and 56 in the position of the carriage 3 shifted by a width of four lines of the photoelectric conversion element trains. In this case, the resolution of 1,200 dpi is the highest resolution of the image reading apparatus according to the first embodiment of the present invention and called the basic resolution. As will be described below, further, one line can be read better in quality with a resolution of 600 dpi by using an input device (not shown) to set an image reading mode giving priority to image quality.

Figure 1:
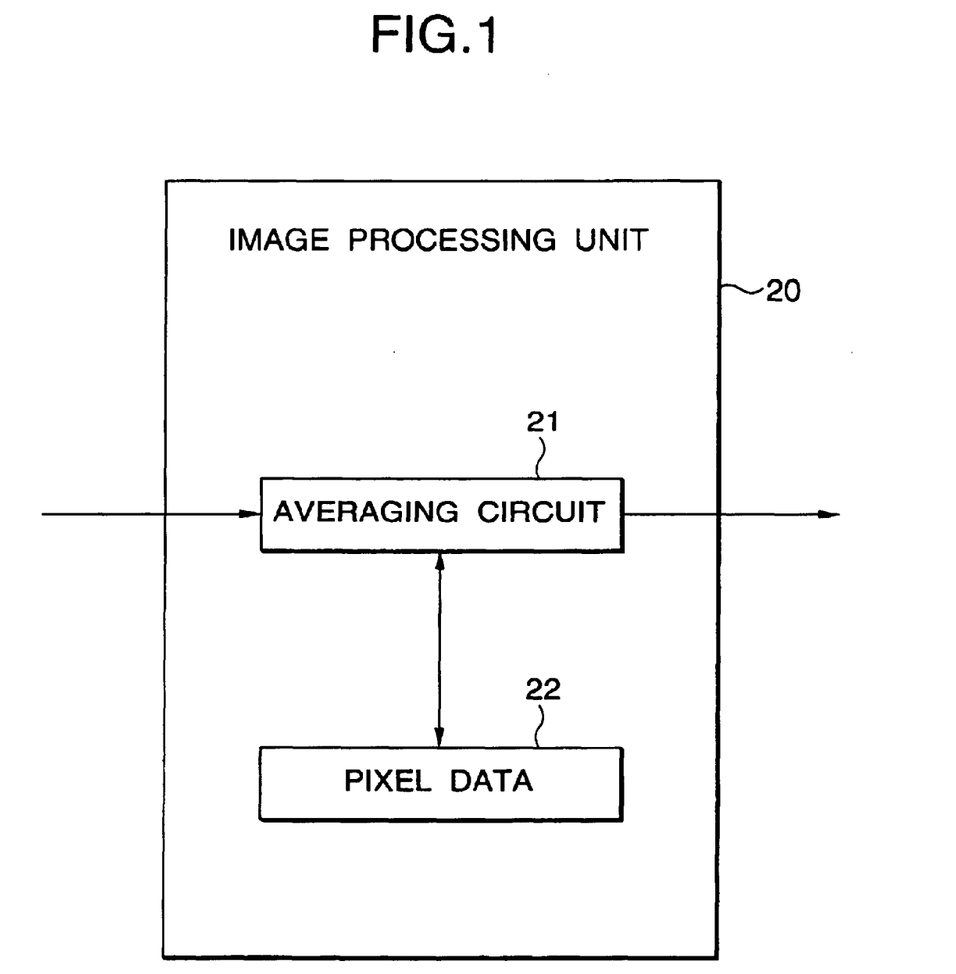
FIG. 1 is a block diagram illustrating the image processing apparatus of an image reading apparatus according to a first embodiment of the present invention.

A detailed description will now be given of the image processing unit 20 with reference to FIG. 1.

The image processing unit 20 includes an averaging circuit 21 as an averaging device and a memory 22 as a pixel data storage device for storing pixel data.

The memory 22 is a memory for storing the pixel data subjected to analog-to-digital conversion. The averaging circuit 21 is a circuit for performing an average process among a plurality of adjoining pixels on each line stored in the memory 22. Therefore, an area that one pixel reads is read with read resolution by the color image pick-up device having one photoelectric conversion element train with adjoining two pixels in the main scanning direction using the pixel data read by the first photoelectric conversion element trains 51, 53 and 55 and the second photoelectric conversion element trains 52, 54 and 56.

The operation of the image reading apparatus thus arranged will be described.

The user connects a personal computer (not shown) to the interface 15 of the image reading apparatus, places the original 8 on the original glass plate 1 and then instructs the reading operation to be performed by making the personal computer designate the range of reading the original 8 and the read resolution.

When the reading operation is instructed to be performed, the control unit 14 lights the light source 4 so as to move the carriage 3 at a predetermined speed perpendicularly in the arrangement direction of the pick-up elements of each photoelectric conversion element train. Images of one line are read into each photoelectric conversion element train of the color image pick-up device 5 according to the driving signal generated at the predetermined intervals and fed into the image processing apparatus 10. Read resolution in the sub-scanning direction is determined by the time needed to read the line that each photoelectric conversion element train reads and the moving speed of the carriage 3. For example, the carriage 3 is moved by the width of one photoelectric conversion element train each time the carriage 3 reads one line on the original 8, whereby the original can be read with the resolution of 600 dpi in the sub-scanning direction.

When the imaging reading mode giving priority to image quality is set by the input device, that is, when one line is read with the resolution of 600 dpi, the analog pixel data obtained from the first photoelectric conversion element trains 51, 53 and 55 and the first photoelectric conversion element trains 52, 54 and 56 are converted to digital pixel data by the A/D converter unit 12. The pixel data subjected by the shading correcting circuit 13 to shading correction is stored in the memory 22, and the averaging process is performed between the two adjoining pixels in the main scanning direction according to the pixel data read by the first photoelectric conversion element trains 51, 53 and 55 and the first photoelectric conversion element trains 52, 54 and 56. Then the image data subjected to the averaging process is sent to the gamma-correction unit 16.

In the image processing unit 20, the averaging process between the first and second pixels, the averaging process between the third and fourth pixels, the averaging process between the fifth and sixth pixels and so forth are sequentially performed between two pixels on one line basis, thereby a noise component becomes reducible, whereas image quality becomes improvable.

The image data subjected to the averaging process is reduced in noise level to $1/\sqrt{2}$ in comparison with the image data not subjected to the averaging process. The reduction of the noise level is effective particularly in the image data of the dark portion where the inclination of the gamma function used in the gamma-correction unit 16.

When an image reading mode giving priority to resolution is set by the input device subsequently, that is, when one line is read with the resolution of 1,200 dpi, the analog pixel data obtained from the first photoelectric conversion element trains 51, 53 and 55 and the first photoelectric conversion element trains 52, 54 and 56 are converted to digital pixel data by the A/D converter unit 12. The pixel data subjected by the shading correcting circuit 13 to shading correction is stored in the memory 22 and sent to the gamma-correction unit 16 without being subjected to the averaging process. Thus, images can be read with priority given to resolution.

In the first embodiment of the present invention, since each photoelectric conversion element train is disposed with a pitch equivalent to a width of four lines of the photoelectric conversion element trains in the sub-scanning direction, all the photoelectric conversion element trains 51 to 56 can read the same line even though the carriage 3 is moved twice or four times greater when reading is carried out at 600 dpi as the photoelectric conversion element trains read at high speed with a resolution of 300 dpi or 150 dpi in the sub-scanning direction when the read resolution of the photoelectric conversion element trains is 600 dpi. Therefore, high-speed reading becomes possible when the reading is carried out with high resolution in the main scanning direction and with low resolution in the sub-scanning direction.

In the first embodiment of the present invention, the pixel data converted into a digital form is stored in the memory 22, and the averaging process is performed between the adjoining two pixels in the main scanning direction by the pixel data read by the first photoelectric conversion element trains 51, 53 and 55 and the pixel data read by the second photoelectric conversion element trains 52, 54 and 56, thereby the noise component becomes reducible, whereas the S/N ratio becomes improvable. Accordingly, the image quality can be improved with a simple construction.

In the first embodiment of the present invention, further, since an averaging area is obtained by averaging the pixel data read by the first photoelectric conversion element trains 51, 53 and 55 and the second photoelectric conversion element trains 52, 54 and 56, resolution obtainable becomes equal to the read resolution of the color image pick-up device having one pick-up element train. Consequently, the noise component is reducible without lowering the resolution.

In the first embodiment of the present invention, further, the time required when the original 8 is read can be shortened because the same pixel is not read a plurality of times; consequently, high-speed reading with a reduced noise component is made possible thereby.

In the first embodiment of the present invention, further, the input device is used to set an image reading mode different in resolution or image quality in order to read an image corresponding to the set mode giving priority to resolution or image quality, so that any mode giving priority to resolution or image quality is selectively implemented.

Although the image processing unit 20 is placed in the following stage of the shading correcting circuit 13 in the first embodiment of the present invention set forth above, the image processing unit 20 may be arranged in the preceding stage of the shading correcting circuit 13.

Although each photoelectric conversion element train is disposed with the pitch equivalent to the width of four lines of the photoelectric conversion element trains in the first embodiment of the present invention, moreover, such a photoelectric conversion element train may be disposed with any given integer train pitch greater than a two-line pitch according to the present invention. When the photoelectric conversion element train with the read resolution being 600 dpi in the main scanning direction is employed, an arrangement of photoelectric conversion element trains with a two-line pitch allows each photoelectric conversion element train to read the same line when high-speed reading is carried out with the resolution of 300 dpi by moving the carriage mounted with the photoelectric conversion element trains at a speed twice as great as the read resolution being 600 dpi in the sub-scanning direction. An arrangement of photoelectric conversion element trains with a three-line pitch also allows each photoelectric conversion element train to read the same line when high-speed reading is carried out with the resolution of 200 dpi. Further, an arrangement of photoelectric conversion element trains with a six-line pitch allows each photoelectric conversion element train to read the same line when high-speed reading is carried out with the resolution of 300 dpi, 200 dpi and 100 dpi. This is also the cases where photoelectric conversion element trains with any other resolution are employed and where photoelectric conversion element trains with a pitch integer times the width of one line of photoelectric conversion element train are arranged.

2. Second Embodiment

Figure 5:
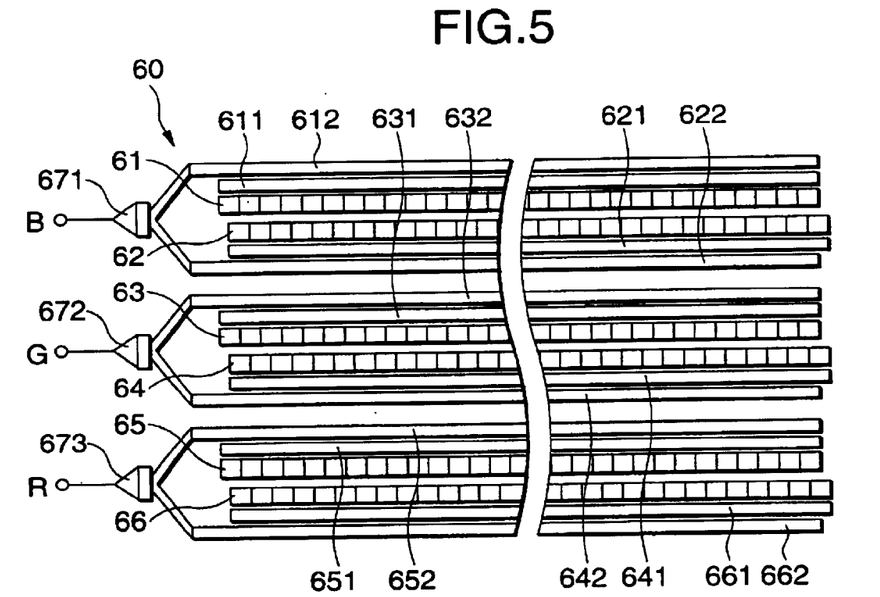
FIG. 5 is an exemplary diagram illustrating the color image pick-up device of an image reading apparatus according to a second embodiment of the present invention.

FIG. 5 shows a second embodiment of the present invention.

In the second embodiment of the present invention, the photoelectric conversion element trains in the first embodiment thereof are arranged adjacently in the sub-scanning direction with the rest of arrangement being similar to that in the first embodiment thereof. Accordingly, like reference characters refer to like components in the first embodiment thereof.

As shown in FIG. 5, a color image pick-up device 60 includes groups of pick-up elements for reading R, G and B light, respectively. The groups of pick-up elements respectively include pick-up element trains such as two lines of photoelectric conversion element trains including the first photoelectric conversion element trains 61, 63 and 65 as the first element trains and the second photoelectric conversion element trains 62, 64 and 66 as the second element trans formed with the linear pick-up elements such as the photoelectric conversion elements vertically in the direction of moving the carriage. The first photoelectric conversion element trains 61, 63 and 65 are arranged by shifting the second photoelectric conversion element trains 62, 64 and 66 in the respective groups of pick-up elements by substantially halt the pitch of the pick-up element in the main scanning direction.

The first photoelectric conversion element trains 61, 63 and 65 and the second photoelectric conversion element trains 62, 64 and 66 in the respective groups of pick-up elements are arranged adjacently in the sub-scanning direction. The charge stored in each photoelectric conversion element train is transferred to shift registers 612, 622, 632, 642, 652 and 662 via transfer gates 611, 621, 631, 641, 651 and 661 in synchronization with a driving signal to be generated at predetermined intervals. The storage of the charge because of light from the next read line is started in each photoelectric conversion element train and the charge transferred to each shift register is outputted sequentially from output portions 671, 672 and 673 on one pixel basis.

Even in the second embodiment of the present invention, the original can be read with high resolution in the arrangement direction of the pick-up elements, that is, in the main scanning direction. The noise component in the main scanning direction is made reducible, whereas the S/N ratio is made improvable by setting the image reading mode giving priority to image quality.

3. Third Embodiment

Figure 6A:
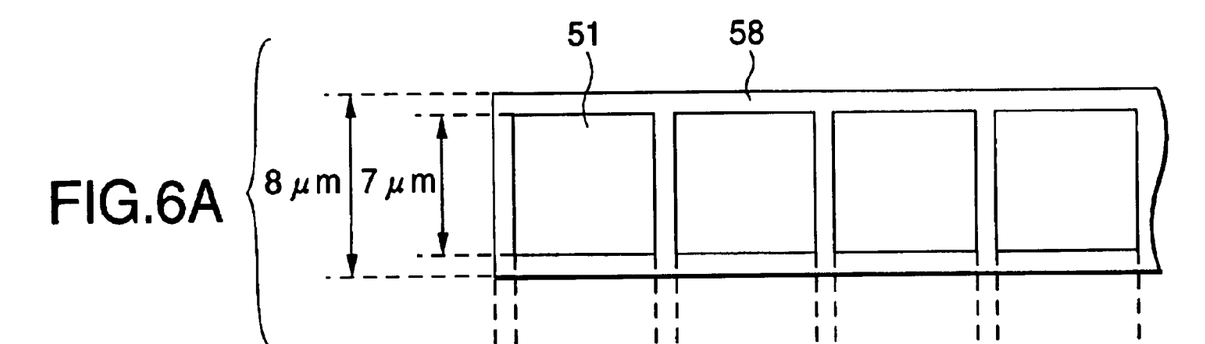
FIG. 6A is a plan view of a pick-up element train in the color image pick-up device of an image reading apparatus according to a third embodiment of the present invention.
Figure 6B:
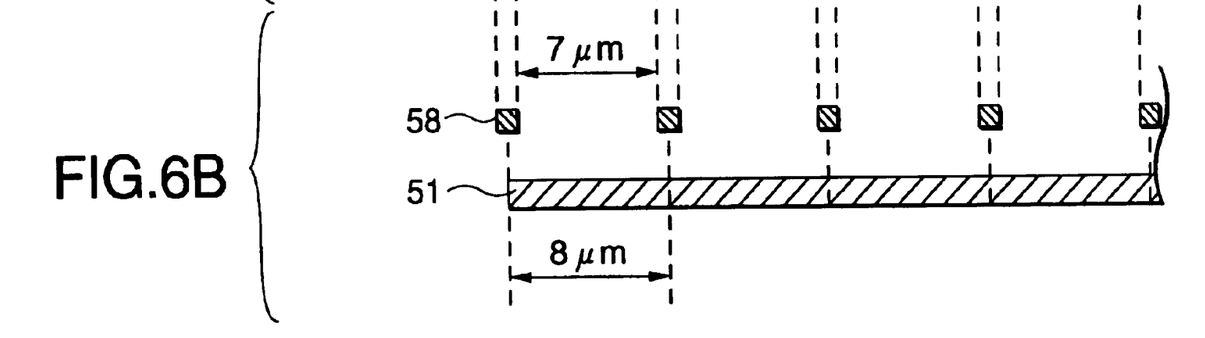
FIG. 6B is a sectional view of the pick-up element train in the color image pick-up device of the image reading apparatus according to the third embodiment of the present invention.

FIGS. 6A and 6B show a photoelectric conversion element train of the color image pick-up device in the image reading apparatus according to a third embodiment of the present invention, wherein FIG. 6A is a plan view and FIG. 6B is a side sectional view.

In the third embodiment of the present invention, an opening smaller than the light receiving area of each element is formed on the light receiving side of each photoelectric conversion element train and a shielding portion 58 for shielding the light directed to the peripheral edge portion of each element is provided. Although the shielding portion 58 provided to the photoelectric conversion element train 51 is shown in FIGS. 6A and 6B, such a shielding portion is also provided to each of the photoelectric conversion element trains 52 to 56. The shielding portion 58 is formed of a metal plate and a square opening 581 of 7 $\mu$m×7 $\mu$m is formed. The rest of arrangement herein is similar to that in the first embodiment of the present invention shown in FIG. 4.

In the third embodiment of the present invention, the light directed to the peripheral edge portion of each element is blocked off by the shielding portion 58, whereby resolution can substantially be improved as the portions read repeatedly by a plurality of elements on the original are decreased. Moreover, a lowering of sensitivity arising from a reduction in the light receiving area is minimized because the sensitivity in the central portion is greater than that in the peripheral edge portion.

In the first, second and third embodiments of the present invention described above, the present invention has been applied to the image reading apparatus wherein the averaging process is performed between two adjoining pixels in the main scanning direction by forming the groups of pick-up elements with the two photoelectric conversion element trains for R, G and B colors and using the pixel data read by the first photoelectric conversion element train and the pixel data read by the second photoelectric conversion element train. However, even in a case where groups of pick-up elements for those colors are formed with three, four or more of photoelectric conversion element trains according to the present invention, the noise component in the main scanning direction is made reducible by performing the averaging process among a plurality of adjoining pixels in the main scanning direction using the pixel data read by the respective photoelectric conversion element trains. Noise levels resulting from performing the averaging process are reduced to 1/√3, 1√4=1/2, respectively.

Further, high-speed reading can be carried out with low resolution in the sub-scanning direction by arranging the photoelectric conversion element trains at equal intervals with a pitch integer times the width of one line of photoelectric conversion element train in the sub-scanning direction. In the case of three lines of photoelectric conversion element trains, for example, the first photoelectric conversion element train is shifted from the second photoelectric conversion element train by about a ⅓ pitch of the length of the pick-up element, and the second photoelectric conversion element train is shifted from the third photoelectric conversion element train by about a ⅓ pitch of the length thereof, so that the improvement of the resolution in the main scanning direction is made about three times greater. In the case of four lines of photoelectric conversion element trains, these photoelectric conversion element trains are shifted from one another by about a ¼ pitch of the length of the pick-up element likewise, so that the improvement of the resolution in the main scanning direction is made about four times greater.

Although one output portion corresponding to the group of pick-up element for each of R, G and B has been provided according to the embodiments of the present invention described above, one output portion may be provided for each photoelectric conversion element train.

Although the present invention has been applied to the carriage-moving flat-bed type image reading apparatus in the embodiments thereof, it may be applicable to a mirror-moving flat-bed type image reading apparatus wherein a color image pick-up device and a condenser lens are fixed, whereas a group of mirrors are moved and to a sheet-feed type wherein an original is read by moving the original or any other image reading apparatus.

What is claimed is:

1. An image reading apparatus reading an image by emitting light from a light source onto a surface of an original, and converting the light reflected from or passed through the surface of the original into an electrical signal, the image reading apparatus comprising:
   a color image pick-up device having groups of pick-up elements corresponding to a plurality of colors, the groups of pick-up elements including a plurality of pick-up element trains which are arranged in parallel to one another on a substrate, the pick-up element train being formed with a plurality of pick-up elements arranged linearly;
   an A/D conversion portion which subjects pixel output data of the color image pick-up device to A/D conversion;
   a pixel data storage device which stores the pixel data subjected by the A/D conversion portion to the A/D conversion;
   an averaging device which applies an averaging process to a plurality of adjoining pixel data on each line stored in the pixel data storage device; and
   a selection device which selects whether applying the averaging process to the plurality of adjoining pixel data on each line stored in the pixel data storage device.

2. The image reading apparatus of claim 1, wherein, in the color image pick-up device, at least one of the pick-up element trains is shifted relative to at least another of the pick-up element trains by a pitch smaller than width of one of the pick-up elements in an arrangement direction of the pick-up elements thereof.

3. The image reading apparatus of claim 2, wherein, in the color image pick-up device, the pick-up element trains are mutually arranged with a pitch integer times greater than twice each height of the pick-up elements in a direction perpendicular to an arrangement direction of the pick-up elements thereof.

4. The image reading apparatus of claim 3, wherein the groups of pick-up elements correspond to red, green and blue, respectively.

5. The image reading apparatus of claim 4, wherein each of the groups of pick-up elements includes a first element train and a second element train, and wherein the second element train is shifted from the first element train by about half pitch of width of one of the pick-up elements.

6. The image reading apparatus of claim 5, wherein each of the groups of pick-up elements includes an opening smaller than a light receiving area of one of the pick-up elements, and a shielding portion blocking off the light directed to a perpendicular edge portion of one of the pick-up elements.

7. An image reading apparatus reading an image by emitting light from a light source onto a surface of an original, and converting the light reflected from or passed through the surface of the original into an electrical signal, the image reading apparatus comprising:

a color image pick-up device having groups of pick-up elements corresponding to a plurality of colors, the groups of pick-up elements including a plurality of pick-up element trains which are arranged in parallel to one another on a substrate, the pick-up element train being formed with a plurality of pick-up elements arranged linearly;

an A/D conversion portion which subjects pixel output data of the color image pick-up device to A/D conversion;

a pixel data storage device which stores the pixel data subjected by the A/D conversion portion to the A/D conversion;

an averaging device which applied an averaging process to a plurality of adjoining pixel data on each line stored in the pixel data storage devices; and an input device capable of setting a mode of reading an image different in at least one of resolution and image quality, wherein the averaging process is not performed when a mode giving priority to resolution is set by the input device but performed when the mode giving priority to image quality is set thereby in order to read the image.

8. The image reading apparatus of claim 7, wherein, in the color image pick-up device, at least one of the pick-up element trains is shifted relative to at least another of the pick-up element trains by a pitch smaller than width of one of the pick-up elements in an arrangement direction of the pick-up elements thereof.

9. The image reading apparatus of claim 8, wherein, in the color image pick-up device, the pick-up element trains are mutually arranged with a pitch integer times greater than twice each height of the pick-up elements in a direction perpendicular to an arrangement direction of the pick-up elements thereof.

10. The image reading apparatus of claim 9, wherein the groups of pick-up elements correspond to red, green and blue, respectively.

11. The image reading apparatus of claim 10, wherein each of the groups of pick-up elements includes a first element train and a second element train, and wherein the second element train is shifted from the first element train by about half pitch of width of one of the pick-up elements.

12. The image reading apparatus of claim 11, wherein each of the groups of pick-up elements includes an opening smaller than a light receiving area of one of the pick-up elements, and a shielding portion blocking off the light directed to a peripheral edge portion of one of the pick-up elements.

* * * * *